US010898771B2

(12) United States Patent
Vanlandingham et al.

(10) Patent No.: US 10,898,771 B2
(45) Date of Patent: Jan. 26, 2021

(54) AUTONOMOUS VEHICLE USED AS GOLF CADDIE AND CART

(71) Applicant: Honda Motor Co., Ltd., Tokyo (JP)

(72) Inventors: Joshua D. Vanlandingham, Marysville, OH (US); Robert S. Zimmerman, Jr., West Liberty, OH (US); Shinichi Karube, Shiki (JP)

(73) Assignee: Honda Motor Co., Ltd., Tokyo (JP)

( * ) Notice: Subject to any disclaimer, the term of this patent is extended or adjusted under 35 U.S.C. 154(b) by 242 days.

(21) Appl. No.: 16/055,820

(22) Filed: Aug. 6, 2018

(65) Prior Publication Data

US 2020/0038724 A1 Feb. 6, 2020

(51) Int. Cl.
*A63B 55/60* (2015.01)
*G05D 1/02* (2020.01)
(Continued)

(52) U.S. Cl.
CPC ......... *A63B 55/61* (2015.10); *B60W 30/0953* (2013.01); *G05D 1/0238* (2013.01);
(Continued)

(58) Field of Classification Search
CPC .. G05D 1/0238; G05D 1/0278; G05D 1/0289; G05D 2201/0204; G05D 1/0088;
(Continued)

(56) References Cited

U.S. PATENT DOCUMENTS 3,812,929 A * 5/1974 Farque .................. A63B 55/61
180/167
5,944,132 A * 8/1999 Davies et al. ......... A63B 55/61
180/168
(Continued)

FOREIGN PATENT DOCUMENTS

EP 2915715 B1 5/2017
JP 11237918 A * 8/1999 ............. A63B 55/60
(Continued)

OTHER PUBLICATIONS

Derwent Summary of JP11237918A, Derwent-Acc-No. 1999-546256, Nakai et al, 3 pages (Year: 1999).*

*Primary Examiner* — Dale W Hilgendorf
(74) *Attorney, Agent, or Firm* — American Honda Motor Co., Inc.; Mark E. Duell

(57) ABSTRACT

A method for using an autonomous vehicle as a caddie and cart. The method includes selecting caddie mode from a group including a caddie mode and a cart mode, selecting a mode in the caddie mode from a group including a caddie advice mode, a swing detection mode, and a golf ball detection mode. In another embodiment, the method includes selecting the cart mode and selecting a mode in the cart mode from a group including a follow golfer mode, a ride mode, and a golf ball mode. The autonomous vehicle includes a vehicle frame and a body, a vehicle propulsion unit, a plurality of wheels driven by the vehicle propulsion unit, a controller for selecting a mode of operation, a display for communicating data to the golfer, a camera for supplying data to the controller, and a GPS apparatus for determining a position of the autonomous vehicle.

20 Claims, 8 Drawing Sheets

(51) Int. Cl.
*B60W 30/095* (2012.01)
*G05D 1/00* (2006.01)
*G01C 22/00* (2006.01)

(52) U.S. Cl.
CPC ......... *G05D 1/0278* (2013.01); *G05D 1/0289* (2013.01); *G01C 22/004* (2013.01); *G05D 1/0088* (2013.01); *G05D 1/0214* (2013.01); *G05D 2201/0204* (2013.01)

(58) Field of Classification Search
CPC ............. G05D 1/0214; B60W 30/0953; G01C 22/004
See application file for complete search history.

(56) References Cited

U.S. PATENT DOCUMENTS

| | | | |
|---|---|---|---|
| 9,869,999 B2 | 1/2018 | Doane et al. | |
| 2017/0108860 A1* | 4/2017 | Doane et al. | G01D 1/0278 |
| 2019/0151725 A1* | 5/2019 | Bennett | A63B 55/61 |
| 2019/0155274 A1* | 5/2019 | Lee | G01D 1/0214 |

FOREIGN PATENT DOCUMENTS

| | | |
|---|---|---|
| JP | 2013-061852 A | 4/2013 |
| WO | 2014/069584 A1 | 9/2016 |

\* cited by examiner

AUTONOMOUS VEHICLE USED AS GOLF CADDIE AND CART

TECHNICAL FIELD

The embodiments disclosed herein are related to the field of autonomous vehicles, and more particularly when used as a golf caddie and cart.

BACKGROUND

An autonomous vehicle is an unmanned vehicle that is generally capable of sensing its environment and navigating without input from a driver. An autonomous vehicle may perform autonomous driving by recognizing and determining surrounding environments through various sensors attached to the autonomous vehicle. Further, an autonomous vehicle may enable a destination to be set and move to the set destination via autonomous driving.

In the game of golf, a caddie is typically a person who carries a golfer's bag and clubs on a golf course from hole to hole. The caddie may also give advice or feedback to the golfer. A caddie may further help the golfer understand the yardage or distance to a pin, pin placements, and provide assistance with club selection.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, a method for providing golf caddie services to a golfer using an autonomous vehicle is disclosed, the golfer playing with a golf ball and a plurality of golf clubs. The method includes selecting a caddie mode from a group including (1) the caddie mode and (2) a cart mode, selecting a mode in the caddie mode selected from a group including (1) a caddie advice mode, (2) a swing detection mode, and (3) a golf ball detection mode, and selecting the cart mode.

According to another aspect, a method for providing golf caddie services to a golfer using an autonomous vehicle is disclosed, the golfer playing with a golf ball and a plurality of golf clubs. The method includes selecting a cart mode from a group including (1) a caddie mode and (2) the cart mode, and selecting a mode in the cart mode selected from a group including (1) a follow golfer mode, (2) a ride mode, and (3) a golf ball mode.

According to yet another aspect, an autonomous vehicle for use as a golf caddie and cart for a golfer having a golf ball and a plurality of golf clubs includes a vehicle frame and a body attached to the vehicle frame, a vehicle propulsion unit attached to the vehicle frame, a plurality of wheels driven by the vehicle propulsion unit, a controller for selecting a mode of operation, a display in communication with the controller for communicating data to the golfer, a camera in communication with the controller for supplying data to the controller, and a global positioning satellite apparatus for determining a position of the autonomous vehicle.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
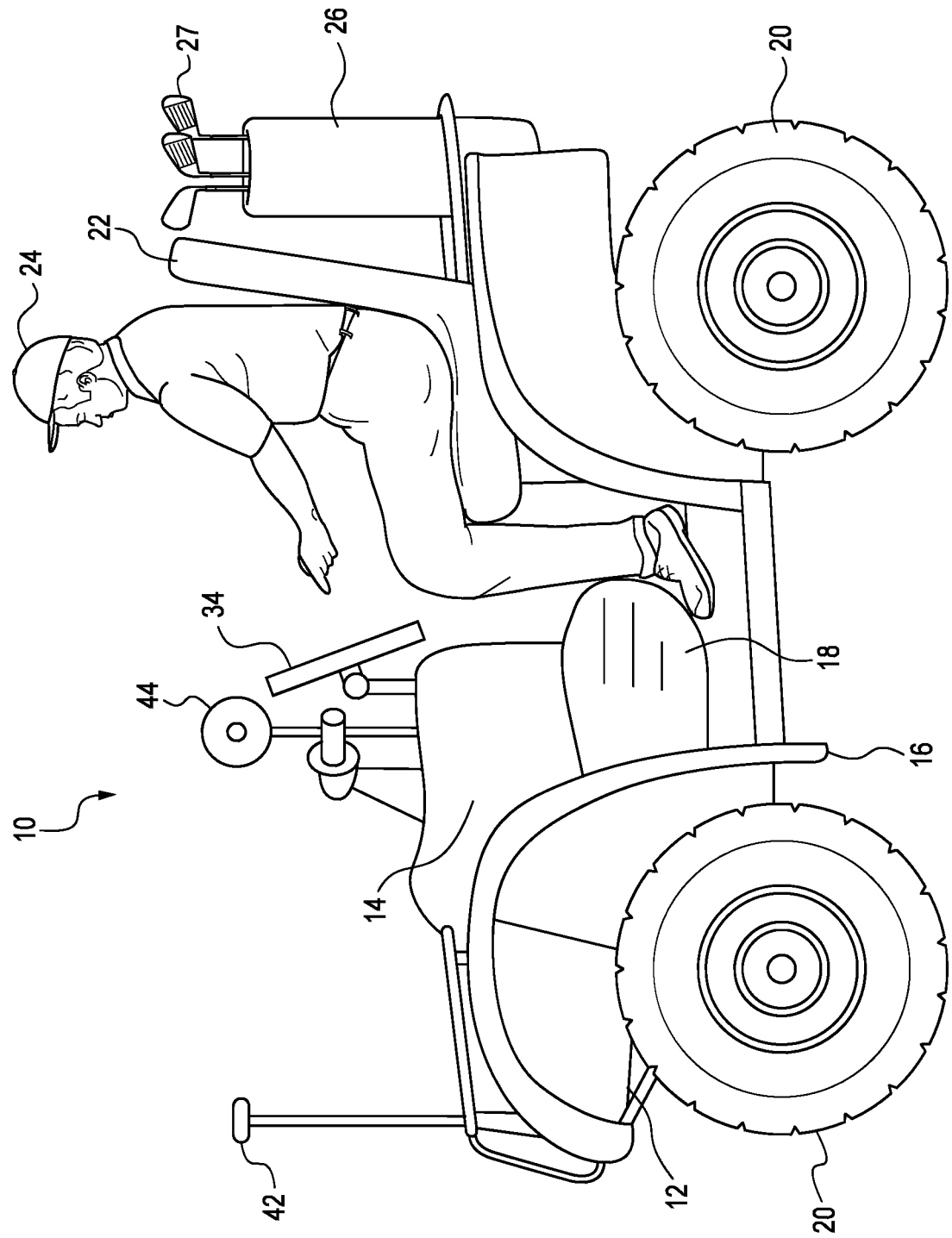
FIG. 1 is side view of an autonomous vehicle equipped to be used as a golf caddie and cart.

FIG. 1 is a side view of an autonomous vehicle 10 to be used as an autonomous golf caddie and cart. The autonomous vehicle 10 includes a vehicle frame 12 and a body 14 attached to the vehicle frame 12. A vehicle propulsion unit 16 may also be attached to the frame 12. The vehicle propulsion unit 16 may be a four-stroke internal combustion engine, a two-stroke internal combustion engine, an electric motor, or any other appropriate motive apparatus. In the case where the vehicle propulsion unit 16 is an internal combustion engine, the autonomous vehicle may further include a fuel tank. In the case where the vehicle propulsion unit 16 is an electric motor, as illustrated in FIG. 1, the autonomous vehicle 10 may further include a battery or battery pack 18 for storing electric charge. The autonomous vehicle 10 may further include a plurality of wheels 20, four (4) in the embodiment illustrated in FIG. 1, attached to the vehicle frame 12 and driven by the vehicle propulsion unit 16. The autonomous vehicle 10 also may include a seat 22 or a plurality of seats, one seat 22 in the embodiment illustrated in FIG. 1, for a golfer 24 or a plurality of golfers as the case may be. The body 14 of the autonomous vehicle may also be configured to hold a golf bag 26 carrying a plurality of clubs 27, typically around fourteen (14), preferably for each golfer 24 accommodated by the arrangement of seats 22. Operation of the autonomous vehicle 10 is further described in U.S. patent application Ser. No. 15/910,832 for "Control System for Autonomous All-Terrain Vehicle (ATV)," filed Mar. 2, 2018 and U.S. patent application Ser. No. 15/915,174 for "Autonomous All-Terrain Vehicle (ATV)," filed Mar. 8, 2018, both of which are hereby incorporated by reference in their entirety.

Figure 2:
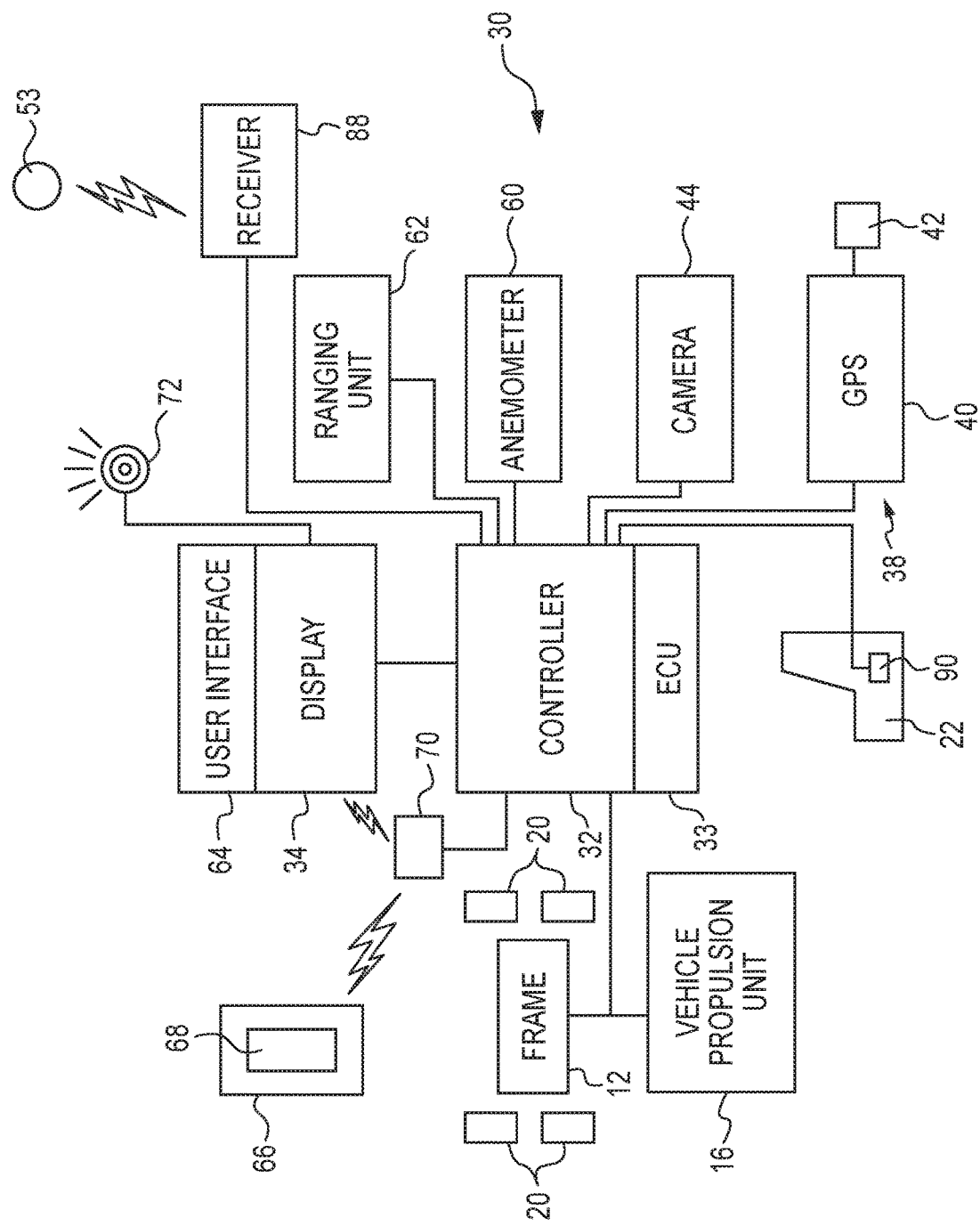
FIG. 2 is a schematic view of a control and accessory system on board the autonomous vehicle of FIG. 1.

FIG. 2 is a schematic view of the control and accessory system 30 of the autonomous vehicle 10 configured to be used as an autonomous golf caddie and cart. The autonomous vehicle may include a controller 32, including an ECU 33, for controlling operation of the autonomous vehicle 10.

The controller 32 may be a dedicated controller embedded in the autonomous vehicle 10, a computer, a tablet device, or any other suitable controller for controlling the autonomous vehicle 10. The controller 32 may be in communication with the vehicle propulsion unit 16 to control the movement of the autonomous vehicle 10 by any known method to those skilled in the art. The controller 32, through a drive-by-wire system that is known to those skilled in the art, may also be in communication with the frame 12 to steer the wheels 20 in conjunction with the operative control of the vehicle propulsion unit 16.

Figure 3:
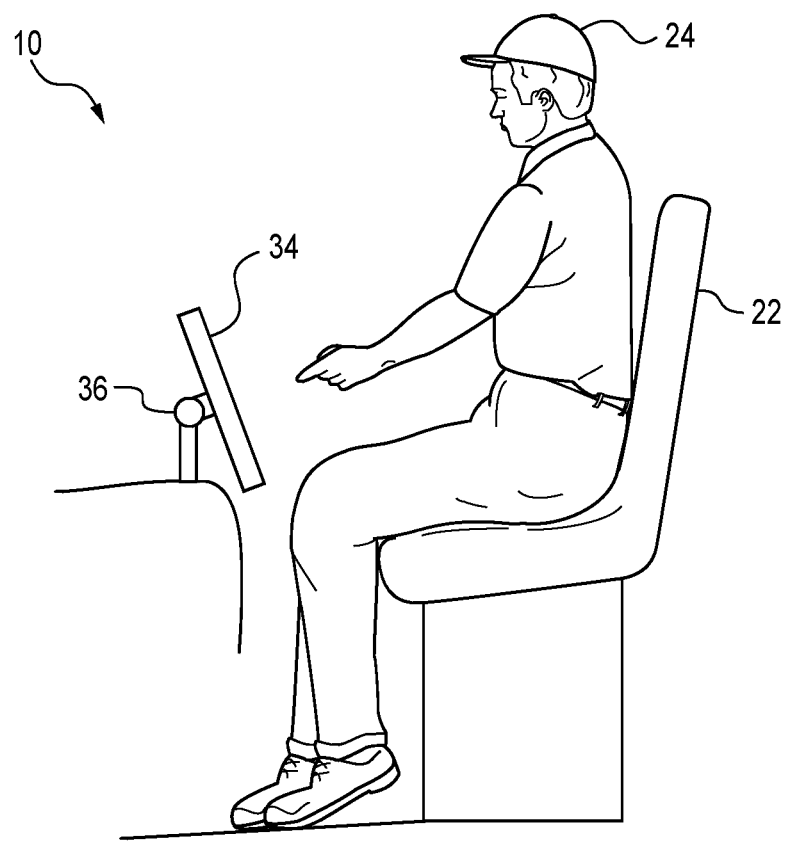
FIG. 3 is a side view of a cockpit portion of the autonomous vehicle of FIG. 1.

The control and accessory system 30 may also include a number of features to support the use of the autonomous vehicle 10 as an autonomous golf caddie and cart. The controller 32 may be in electrical communication with a display 34 to provide feedback to the golfer 24 and to assist in the operation of the autonomous vehicle 10. The display 34 may be located in a position such that it is visible by the golfer 24 when seated in or on the autonomous vehicle 10. As illustrated in FIG. 3, the display 32 may further be attached to the autonomous vehicle 10 by any suitable joint 36, such as a ball and socket joint, that enables the display 32 to be oriented to be viewed while the golfer 24 is seated a seat 22 in the autonomous vehicle 10, as illustrated in FIG. 3, or standing outside of the autonomous vehicle 10. The display 34 may be any type of suitable display, such as an LCD display, LED display, OLED display, a touch display, or any other suitable display known to those skilled in the art. Alternatively, the display 34 may be integrated with the controller 32 in a tablet-type computer, such as an iPad®, or any other suitable device mounted to the autonomous vehicle 10.

The autonomous vehicle 10 may further include a location detection system 38 to determine the location of the autonomous vehicle. In the embodiment illustrated in FIG. 2, the location detection system 38 is a global positioning system (GPS) receiver 40 in communication with the controller 32 and an associated dual GPS antenna 42 mounted on the autonomous vehicle 10, which are operable in a conventional manner known to those skilled in the art. In addition to GPS, the receiver may use other positioning standards and GNSS systems, such as GLONASS, BeiDou, Galileo, NavIC, SBAS, QZSS, and the like.

Figure 4:
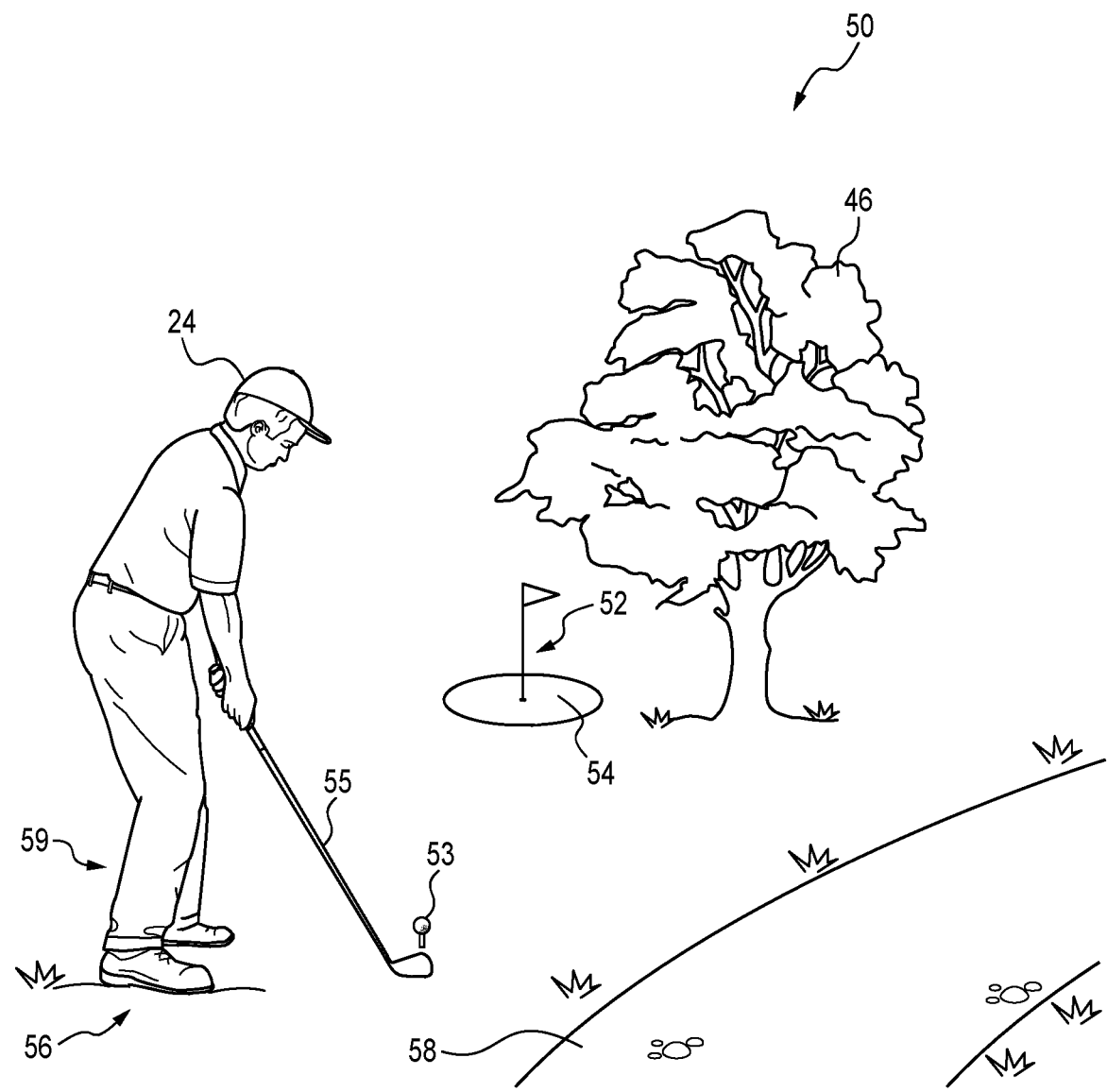
FIG. 4 is a schematic representation of a view of golf hole on a golf course as viewed from the autonomous vehicle when used as a golf caddie and cart.

The autonomous vehicle 10 may further include a camera 44 for detecting and recording the golfer 24 and detecting obstacles 46, as shown in FIG. 4, in front of the autonomous vehicle 10, such as trees, shrubs, other golfers, and the like. In the embodiment illustrated, the camera 44 is an omnidirectional camera, the type of which are well known to those skilled in the art, that is in communication with the controller 32 to provide images, like the view of a golf hole 56 on a golf course 50 that is illustrated in FIG. 4, to the controller 32 for use by the controller 32. The camera 44 provides substantially a 360° field of view, which allows the controller 32 of the autonomous vehicle 10, using images from the camera 44, to identify, using recognition techniques known to those skilled in the art, the position of the golfer 24 relative to the location of the autonomous vehicle 10. The camera 44, along with data from the location detection system 38, may be used to identify the location of the golfer 24 on the golf course 50, the location of a pin 52 on a green 54 of a hole 56, the location and size of obstacles 46, such as trees, shrubs, rocks, streams or ponds, sand traps, and the like.

Images from the camera 44 may also be used by the controller 32 to maintain the autonomous vehicle 10 on a designated cart path 58, particularly between holes 56 or when carts are not permitted on the fairways 59, such as in wet or rainy conditions. Images from the camera 44 may also be used by the controller 32 to ensure the autonomous vehicle 10 does not drive onto a green 54 or any other designated locations where carts are prohibited, which is discussed in greater detail below.

The autonomous vehicle 10, as schematically illustrated in FIG. 2, may further include an anemometer 60 in communication with the controller 32. The anemometer 60, which may be either mechanical or digital, both of which are known to those skilled in the art, is used to determine wind speed or intensity and direction. The wind speed and direction may then be communicated through the controller 32 and display 34 to the golfer 24. The wind speed and direction may also be used in calculations made by the controller 32 discussed in greater detail below.

As also schematically illustrated in FIG. 2, the autonomous vehicle may include a ranging unit 62 for use in determining a distance from the autonomous vehicle 10 to a target, such as a pin 52, a golf ball 53, or any other target on the golf course 50. In the embodiment, the ranging unit 62 is in communication with the controller 32, thus communicating range data from the ranging unit 62 to the controller 32, and communicating positioning and target location from the controller 32 to the ranging unit 62. In a typical mode of operation, a target object is detected by the controller 32 using an image from the camera 44, and the controller 32 directs the ranging unit 62 to determine the distance to the object. In the embodiment illustrated in FIG. 2, the ranging unit 62 is a LIDAR unit working in a conventional manner known to those skilled in the art. While a LIDAR unit is disclosed, any similar unit, such as radar, sonar, ranging sensors, or any other type of ranging unit known to those skilled in the art may be used.

The autonomous vehicle 10 also includes a user interface 64 for allowing a golfer 24 to make mode selections on the autonomous vehicle 10. The user interface 64 is in communication with the controller 32 to select a mode of operation. In the embodiment illustrated in FIG. 2, the user interface 64 is integrated within a touch screen on the display 34 on the autonomous vehicle 10. In alternate embodiments, the user interface 64 may include a keyboard associated with the controller 32, dedicated buttons located on the autonomous vehicle 10, or a touch screen associated with a tablet computer in communication with the controller 32 of the autonomous vehicle 10.

In yet another embodiment, the controller 32 may be in communication with an application 68 on a personal device 66 in the possession of the golfer 24 that acts as the user interface 64. The application 68, or "app," may communicate with the controller 32 through wireless communication, such as a cellular or Wi-Fi connection, or through a BLUETOOTH® connection on the personal device 66, such as a smart telephone, portable device, wearable device, or other Internet-connected device. The autonomous vehicle 10 may also include a wireless transceiver 70, such as an embedded cellular telephone, a Wi-Fi transceiver, or a BLUETOOTH® module in communication with the controller 32 for communication with any associated personal device 66. Additionally, the controller 32 may communicate with the display 34 and user interface 64 on the autonomous vehicle 10 though the wireless transceiver 70, particularly if the display 34 is a removable tablet computer.

Figure 5:
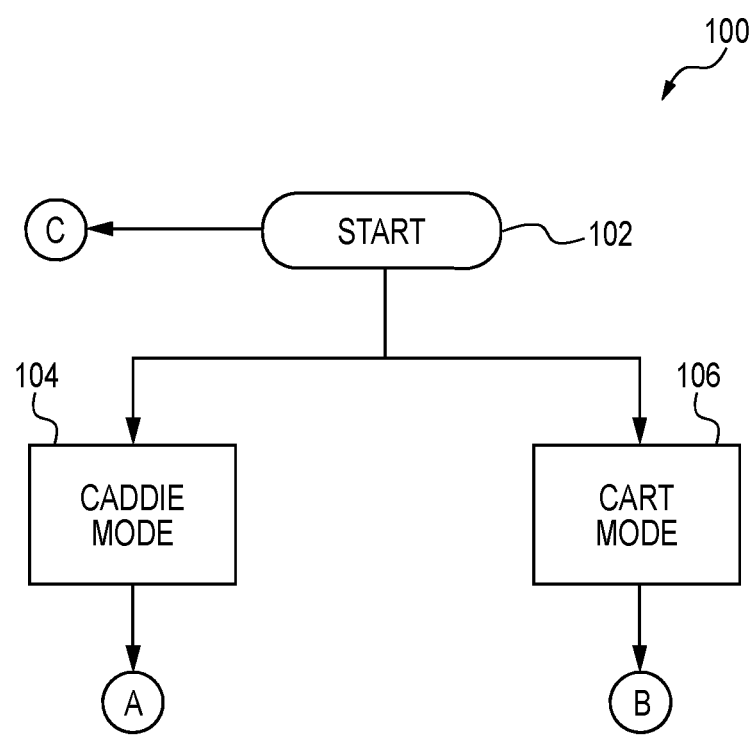
FIG. 5 is a flow of a top level of a method of using the autonomous vehicle as a golf caddie and cart.

FIG. 5 is a flowchart illustrating one embodiment of a method of operation 100 of the autonomous vehicle 10 as a golf caddie and cart. The autonomous vehicle 10, through making a selection through the user interface 64 as discussed above, may operate in a number of modes such that the autonomous vehicle 10 may be used as virtual caddie, as a golf cart, or both. As the golfer 24 prepares to use the autonomous vehicle 10, the golfer 24 is first given a start menu 102 from which the golfer 24 may select between a caddie mode 104 and a cart mode 106 as illustrated in FIG. 5.

Figure 6:
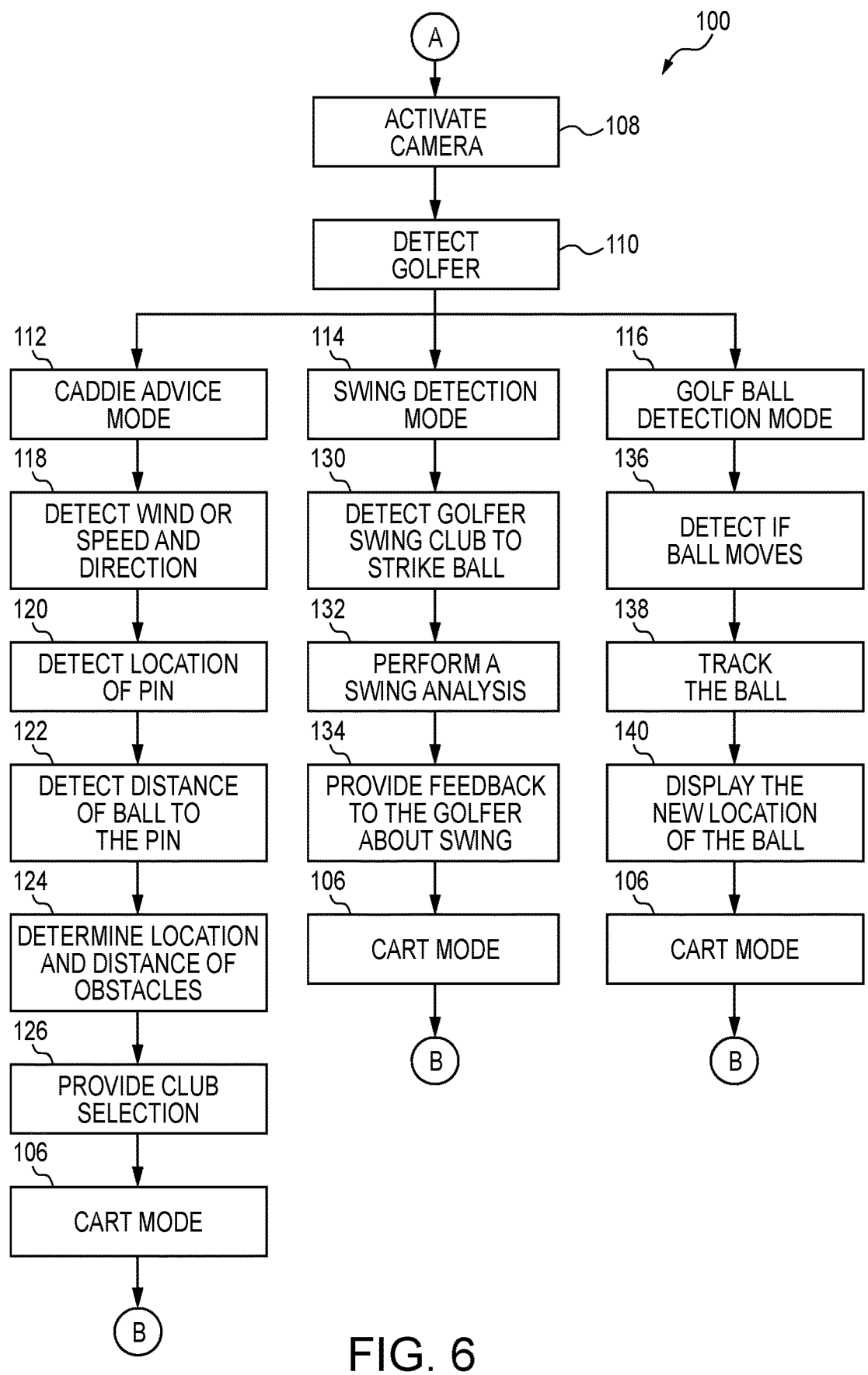
FIG. 6 is a flow chart of the method of using the autonomous vehicle as a golf caddie and cart in a caddie mode.

FIG. 6 illustrates the flowchart of the caddie mode when the golfer 24 selects the caddie mode 104 using the user interface 64 from the start menu 102. In the embodiment illustrated, the golfer 24 may select from one of three (3) modes: (1) a caddie advice mode 112, (2) a swing detection mode 114, or (3) a golf ball detection mode 116. Finally, after one of the three (3) modes is selected and the selected mode is completed, the autonomous vehicle 10 may enter the cart mode 106.

After the golfer makes the first mode selection between selecting caddie mode 104 and cart mode 106, the controller 32 acts to enter the selected mode and acts according to the following steps. When the caddie mode 104 is first selected, the controller 32 may, in step 108 activate the camera 44 on the autonomous vehicle 10, and in step 110, use images from the camera 44 to detect the presence and location of the golfer 24.

If the golfer 24 selects the caddie advice mode 112, the controller 32 further completes step 118 by detecting the speed and direction of the wind using the anemometer 60 on board the autonomous vehicle 10 and in communication with the controller 32. The controller 32 may also complete step 120 by detecting the distance from the golf ball 53 to a pin 52 located on a green 54 of the golf hole 56 that is being played by the golfer 24. The location of the pin 52 and the green 54 may be detected by using images from the camera 44, such as the view illustrated in FIG. 4, and the location information may be communicated to the golfer 24 via the display 34. Once located, in step 122, the distance may be determined by the controller 32 directing the ranging unit 62 to the location and calculating the distance from data from the ranging unit 62 once oriented in the correction direction. The distance data may be communicated to the golfer 24 on the display 34, or audibly through speakers 72 in communication with the controller 32 and associated with the display 34, whether on the autonomous vehicle 10, or on a personal device 66 in communication with the controller 32. Images from the camera 44 may also be used in step 124 to the identify the presence of any obstacles 46 or golf hole 56 features between the golfer 24 and the pin 52, such as trees, sand traps, streams or ponds, and the like. The ranging unit 62 may further be used to determine a distance between the golfer 24 and the obstacles 46 or golf hole 56 features, which obstacle distance data communicated in the same manner as the pin distance data. The controller 32 may also provide information from a map of the golf hole 56 in a database, such shape, incline, elevation, lawn grass direction, length of cut, and the like.

Once the controller 32 is able to determine the distance to the pin 52 and distance to any obstacles 46, if determined to be present, in step 126 the controller 32 provides a selection of a golf club 55 from the plurality of clubs 27 the autonomous vehicle 10 is carrying in the bag 26 for the golfer 24. The golf club 55 selection may be based on a number of factors, including distance to the pin 52, the presence of and distance to any obstacles 46, wind speed and direction, which may affect the distance and direction the golf ball 53 may travel, and the expected distance the golfer 24 can hit the golf ball 53 with each of the plurality of clubs 27. The expected distance data may be taken from a table based on an average golfer, the golfer 24 may enter the expected distance data in advance of a round of golf, or the expected distance data may be learned by the controller 32 taking data from the golfer 24 over time in a method known to those skilled in the art. In a further embodiment, the golfer 24 may further may be given a choice between the plurality of clubs 27 based on a decision whether the golfer 24 wants to aim for the pin 52, or if the golfer 24 wants to play around obstacles 46.

If the golfer 24 selects the swing detection mode 114, the controller 32 uses images from the camera 44 to detect when the golfer 24 swings the club 55 to strike the golf ball 53 in step 130. The controller 32 then, in step 132, performs a swing analysis in any method known to one skilled in the art. In one embodiment, the controller 32 compares images from the camera 44 of the swing of the golfer 24 to a library of images to analyze the swing, or through the use of an algorithm. In the next step 134, the controller 32 may provide feedback to the golfer 24 through the display 34, through an application 68, or through speakers 72 in communication with the controller 32 or display 34. The feedback may provide positive information, such as "nice swing." The feedback may also include a more detailed analysis, such as, but not limited to, advice on how to improve the swing.

If the golfer 24 selects the golf ball detection mode 116, in the first step 136, the controller 32 uses the camera 44 to detect the golf ball 53 and determine, based on a series of images, if and when the golf ball 53 moves. Once a movement is detected, in the next step 138, the controller 32 uses images from the camera 44 to track the golf ball 53, and in the final step 140, displays the new location of the golf ball 53 to the golfer 24 on the display 34. In an alternative embodiment, the location may be communicated to the golfer 24 using an application 68 on the personal device 66 of the golfer 24 as previously discussed. In an alternate embodiment, a microphone in communication with the controller 32 may further be used to detect striking of the golf ball 53.

Figure 7:
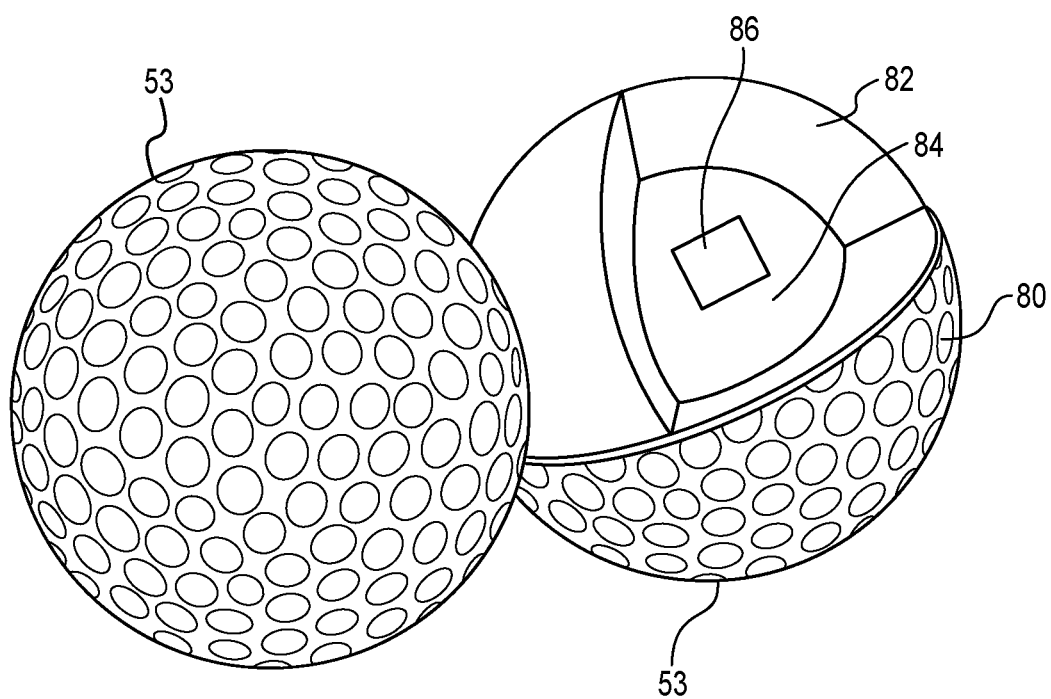
FIG. 7 is a view of two golf balls illustrating one embodiment of an exterior and an interior of a golf ball for use with autonomous vehicle when used as a golf caddie and cart.

As illustrated in FIG. 7, which shows a typical golf ball 53, and a golf ball 53 with a portion of the outer shell 80 removed to illustrate an outer winding 82, with a portion removed to reveal the core 84. An alternative to using the camera 44 to track the golf ball 53 may include the golf ball 53 with a RFID transponder 86 embedded within the golf ball 53. The controller 32 may track the golf ball 53 with a corresponding receiver 88, schematically illustrated in FIG. 2, in communication with the controller 32. The RFID transponder 88 may emit a signal on a BLUETOOTH® or similar frequency, or any other suitable frequency that is receivable by the corresponding receiver 88 on the autonomous vehicle 10.

Although described above with respect to one golfer 24, the caddie mode may also serve multiple players with respect to carrying multiple bags 26, providing advice to multiple players, analyzing each swing, and the like.

Figure 8:
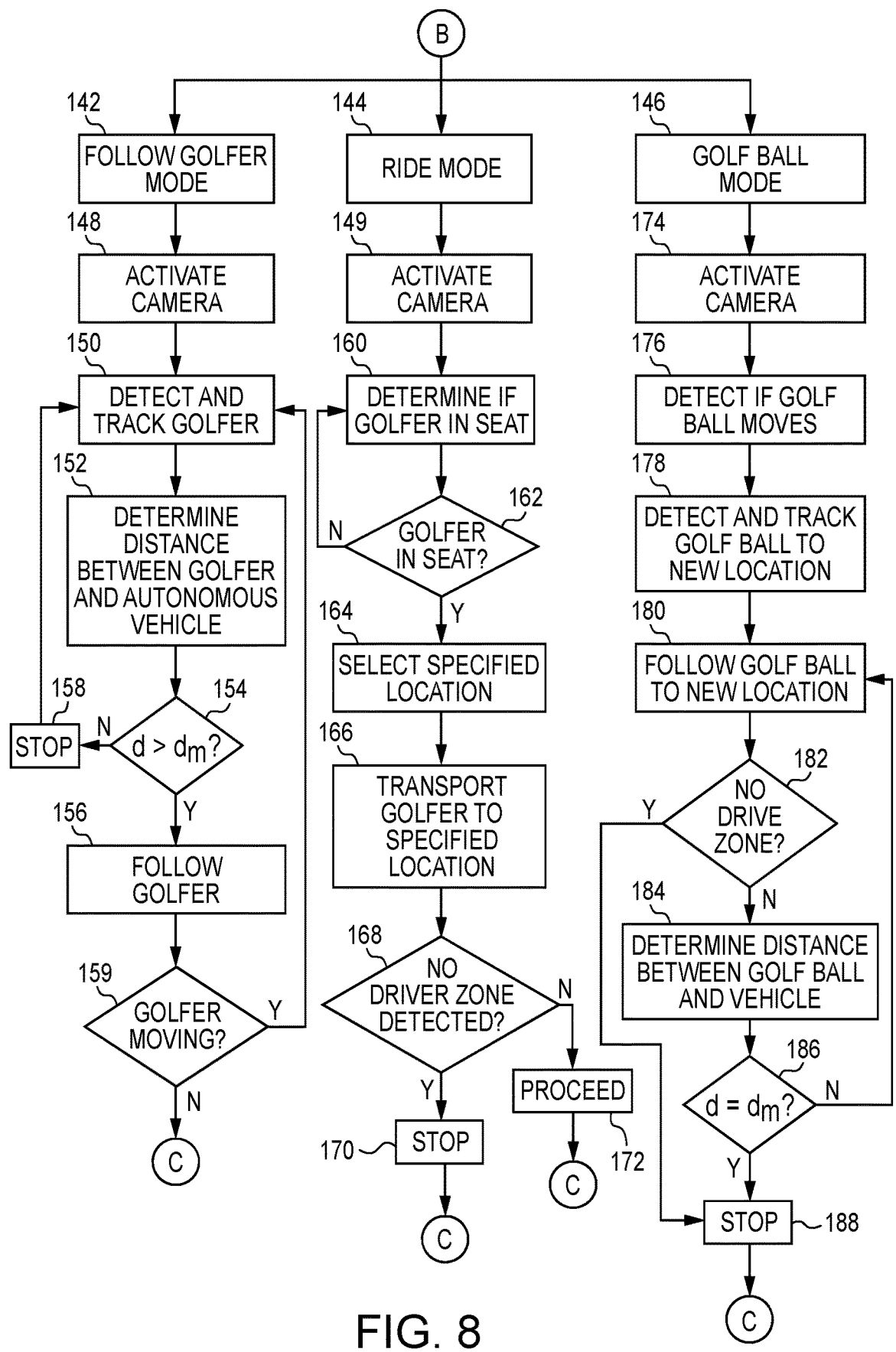
FIG. 8 is a flow chart of the method of using the autonomous vehicle as a golf caddie and cart in a cart mode.

As illustrated in the flowchart in FIG. 5, the golfer 24 may also select a cart mode 106, which is followed, as illustrated in FIG. 8, by the golfer 24 being prompted on the display 34 to select, using the user interface 64, to select between (1) a follow golfer mode 142, (2) a ride mode 144, or (3) a golf ball mode 146.

When the follow golfer mode 142 is selected, the controller 32 activates the camera 44 on the autonomous vehicle 10 in the next step 148, and using images from the camera 44, moves on to the next step 150 of using an algorithm to detect and track the golfer 24 by methods known to those skilled in the art.

Further, in step 156, the autonomous vehicle 10 is directed by the controller 32 to follow the golfer 24 as the golfer 24 walks the golf course 50. This most often occurs after the golfer 24 hits the golf ball 53 and walks to the new location of the golf ball 53, or as the golfer 24 is walking between holes 56 or between a hole 56 and a clubhouse or other location off the golf course 50.

However, prior to the step of following the golfer 156, the controller 32 directs the autonomous vehicle 10, in step 152, to determine the distance d between the golfer 24 and the autonomous vehicle. In step 154, the autonomous vehicle 10 will only move if the distance d between the golfer 24 and the autonomous vehicle 10, as determined either by using an algorithm to analyze images from the camera 44 or by taking data from the ranging unit 62 on board the autonomous vehicle 10 in communication with the controller 32, is greater than a specified minimum distance $d_m$ to be maintained. For example, a minimum distance $d_m$ of 3.0 m may be specified. If the golfer 24 is detected to be a distance d greater than the $d_m$ of 3.0 m, such that $d>d_m$, from the autonomous vehicle 10, the controller 32 may direct the autonomous vehicle 10 to move to step 156, allowing the autonomous vehicle to move towards the golfer 24, most likely in a straight line unless an obstacle 46 to avoid is detected, in which case the autonomous vehicle 10 may take an alternate pathway to reach the golfer 24. Once the autonomous vehicle 10 is judged to reach the specified minimum distance such that $d=d_m$, the autonomous vehicle 10 is directed to stop in step 158. Further, at any time the golfer 24 walks toward the autonomous vehicle 10 such that the distance d between the golfer 24 and the autonomous vehicle 10 is less than the specified distance $d_m$, i.e. $d<d_m$, the autonomous vehicle 10 does not move unless manually moved by operation of the autonomous vehicle 10 by the golfer 24. This prevents the autonomous vehicle 10 from moving away from the golfer 24, or moving when the golfer 24 is close to the autonomous vehicle 10. The specified minimum distance $d_m$ may be selected at any time by operation of the user interface 64 by the golfer 24, or through a prior standardized setting.

Finally, in step 159, if the golfer 24 is determined to have stopped moving or walking, the follow golfer mode 142 may end, and a return to the start menu 102 will commence. The end of the follow golfer mode 142 may also occur if the golfer 24 walks toward the autonomous vehicle 10, such that the distance d is decreasing, which may determine that the golfer 24 wishes to change modes or make a selection from the plurality of clubs 27. In either event, the follow golfer mode 142 will end and the controller 32 will return to the start menu 102.

In step 149, when the ride mode 144 is selected, the controller 32 activates the camera 44 on the autonomous vehicle 10, and using images from the camera 44, provides transportation for the golfer 10. The controller 32 in step 160, using a sensor such as a seat sensor 90 or the camera 44, detects if the golfer 24 is seated on the seat 22 associated with the autonomous vehicle 10. In step 162, when the golfer 24 is detected in the seat 22, the autonomous vehicle 10 may drive the golfer 24 to a specified location in step 166. In an alternative embodiment, the controller 32, through the display 34, may first prompt the golfer 24 to confirm the specified location and to confirm the autonomous vehicle 10 may proceed through the user interface 64 in step 164. The location may be specified by pointing to a location on a map of the golf course 50 on the display 64, or the location may be specified from a pick list of common destinations. The common destinations may include, but is not limited to, the location of the golf ball 53, the tee box for the next hole 56 to be played, the clubhouse associated with the golf course 50, the pro shop associated with the golf course 50, and a restroom location associated with the golf course 50.

Additionally, the controller 32 of the autonomous vehicle 10 may be provided with a plurality of no-drive zones in step 168, such that the autonomous vehicle 10 will stop in step 170 and not drive to certain locations, even if selected by the golfer 24 on the map of the course, and will further return to the start menu 102. The no-drive zones may include, but are not limited to, fairways, particularly in wet weather conditions, hole greens 54, in the tee box, and the parking lot associated with the golf course 50. Further, the controller 32 may be programmed to maintain the autonomous vehicle 10 on golf cart pathways 58 that are programmed from a map of the golf course 50 or detected by the controller 32 based on images from the camera 44. Once the autonomous vehicle 10 reaches the specified location by proceeding in step 172, or reaches a no-drive zone and stops in step 170, the autonomous vehicle then returns to the start menu 102.

In step 174, when the follow golf ball mode 146 is selected, the controller 32 activates the camera 44 on the autonomous vehicle 10, and using images from the camera 44, detects a location of the golf ball 53 if the golf ball 53 moves in step 176. If the controller 32 detects the golf ball 53 has moved, likely from the golfer 24 striking it, the controller 32, in step 178, using images from the camera 44 and using the ranging unit 62, as previously disclosed, may track the golf ball 53 to a new location. In step 180, the autonomous vehicle 10 may be directed by the controller 32 to follow the golf ball 32 to the new location.

While driving to the new location of the golf ball 53, the controller 32 directs the autonomous vehicle 10 to determine the distanced between the autonomous vehicle 10 and the golf ball 53 in step 184. In step 186, the autonomous vehicle 10 moves only if a distance d between the golf ball 53 and the autonomous vehicle 10, as determined either by using an algorithm to analyze images from the camera 44 or by taking data from the ranging unit 62 on board the autonomous vehicle 10 in communication with the controller 32, is greater than a specified minimum distance dm to be maintained, i.e. d>dm. For example, a minimum distance of 3.0 m may be specified. If the golf ball 53 is detected to be a distance d greater than the dm of 3.0 m from the autonomous vehicle 10, the controller 32 may direct the autonomous vehicle 10 to move towards the golf ball 53, most likely in a straight line unless an obstacle 46 to avoid is detected, in which case the autonomous vehicle 10 may take an alternate pathway to reach the golf ball 53. Once the autonomous vehicle 10 is judged to be a distance d that is equal to the specified minimum distance dm, such that d=dm, in step 188 the autonomous vehicle 10 may stop. Once stopped, the autonomous vehicle 10 returns to the start menu 102.

If the golfer 24 is playing with a second golfer (not shown), the controller 32 should treat the second golfer's golf ball (not shown), when identified by the controller 32 through the camera 44, as an obstacle 46 that is to be avoided, thereby preventing the autonomous vehicle 10 from running over the second golfer's golf ball.

Additionally, the controller 32 of the autonomous vehicle 10 may be provided with a plurality of no-drive zones in golf ball mode 146 as well in step 182, such that the autonomous vehicle 10 will stop and not drive to certain locations on the golf course 50, proceeding to step 188. The no-drive zones may include, but are not limited to, fairways 59, particularly in wet weather conditions, hole greens 54, in the tee box, and the parking lot associated with the golf course. Further, the controller 32 may be programmed to maintain the autonomous vehicle 10 on golf cart pathways 58 that are programmed from a map of the golf course 50 or detected by the controller 32 based on images from the camera 44 while maintaining the minimum distance $d_m$ between the golf ball 53 and the autonomous vehicle 10.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A method for providing golf caddie and cart services to a golfer using an autonomous vehicle, the golfer playing with a golf ball and a plurality of golf clubs, comprising the steps of:
   selecting a caddie mode from a group comprising (1) the caddie mode and (2) a cart mode;
   selecting a mode in the caddie mode selected from a group comprising (1) a caddie advice mode, (2) a swing detection mode, and (3) a golf ball detection mode; and
   selecting the caddie advice mode;
   wherein the caddie advice mode further comprises the steps of:
   detecting a direction and a speed of wind;
   detecting a distance from the golf ball to a pin located on a green of a golf hole;
   detecting if an obstacle is present between the golfer and the pin; and
   providing a selection of a golf club from the plurality of golf clubs to the golfer.

2. The method of claim 1 wherein the caddie mode further comprises the steps of:
   activating a camera on the autonomous vehicle; and
   detecting the golfer.

3. The method of claim 1 wherein the step of providing the selection of the golf club from the plurality of golf clubs is based upon the direction and the speed of wind, the distance from the golf ball to the pin, and whether the obstacle is detected.

4. The method of claim 1 wherein the swing detection mode further comprises the steps of:
   detecting the golfer swinging one of the plurality of golf clubs to strike the golf ball;
   performing a swing analysis; and
   providing feedback to the golfer based upon the swing analysis.

5. The method of claim 1 wherein the golf ball detection mode further comprises the steps of:
   detecting if the golf ball moves;
   tracking the golf ball if the golf ball moves; and
   displaying a new location of the golf ball to the golfer.

6. The method of claim 5 wherein the new location of the golf ball is displayed to the golfer on a display on the autonomous vehicle.

7. The method of claim 5 wherein the new location of the golf ball is displayed to the golfer on an application associated with the autonomous vehicle.

8. A method for providing golf caddie and cart services to a golfer using an autonomous vehicle, the golfer playing with a golf ball and a plurality of golf clubs, comprising the steps of:
   selecting a cart mode from a group comprising (1) a caddie mode and (2) the cart mode;
   selecting a mode in the cart mode selected from a group comprising (1) a follow golfer mode, (2) a ride mode, and (3) a golf ball mode;
   selecting the ride mode;
   wherein the ride mode further comprises the steps of:
   detecting the golfer on board the autonomous vehicle; and
   driving the golfer to a specified location; and
   wherein the specified location is selected from a group comprising (1) a location of the golf ball, (2) a tee box, (3) a clubhouse, (4) a pro shop, and (5) a restroom.

9. The method of claim 8 wherein the follow golfer mode further comprises the steps of:
   activating a camera on the autonomous vehicle;
   detecting the golfer;
   following the golfer; and
   maintaining a minimum distance between the golfer and the autonomous vehicle, the autonomous vehicle remaining stationary if a distance between the golfer and the autonomous vehicle is at or less than the minimum distance, the autonomous vehicle traveling towards the golfer if the distance is greater than the minimum distance.

10. The method of claim 8 wherein the ride mode first comprises the step of:
    providing the autonomous vehicle with a plurality of no-drive zones, the autonomous vehicle stopping as one of the plurality of no-drive zones is approached to prevent the autonomous vehicle from entering the one of the plurality of no-drive zones.

11. The method of claim 8 wherein the golf ball mode further comprises the steps of:
    activating a camera on the autonomous vehicle;
    detecting if the golf ball moves;
    tracking the golf ball if the golf ball moves; and
    driving to a location that is a minimum specified distance from a new location of the golf ball.

12. The method of claim 11 wherein the golf ball mode first comprises the step of:
    providing the autonomous vehicle with a plurality of no-drive zones, the autonomous vehicle stopping as one of the plurality of no-drive zones is approached to prevent the autonomous vehicle from entering the one of the plurality of no-drive zones.

13. A method for providing golf caddie and cart services to a golfer using an autonomous vehicle, the golfer playing with a golf ball and a plurality of golf clubs, comprising the steps of:
    selecting a caddie mode from a group comprising (1) the caddie mode and (2) a cart mode;

selecting a mode in the caddie mode selected from a group comprising (1) a caddie advice mode, (2) a swing detection mode, and (3) a golf ball detection mode;

selecting the golf ball detection mode; and wherein the golf ball detection mode further comprises the steps of:
  detecting if the golf ball moves;
  tracking the golf ball if the golf ball moves; and
  displaying a new location of the golf ball to the golfer.

14. The method of claim 13 wherein the new location of the golf ball is displayed to the golfer on a display on the autonomous vehicle.

15. The method of claim 13 wherein the new location of the golf ball is displayed to the golfer on an application associated with the autonomous vehicle.

16. The method of claim 13 wherein the caddie mode further comprises the steps of:
  activating a camera on the autonomous vehicle; and
  detecting the golfer.

17. A method for providing golf caddie and cart services to a golfer using an autonomous vehicle, the golfer playing with a golf ball and a plurality of golf clubs, comprising the steps of:

selecting a cart mode from a group comprising (1) a caddie mode and (2) the cart mode;

selecting a mode in the cart mode selected from a group comprising (1) a follow golfer mode, (2) a ride mode, and (3) a golf ball mode;

selecting the golf ball mode; and wherein the golf ball mode further comprises the steps of:
  activating a camera on the autonomous vehicle;
  detecting if the golf ball moves;
  tracking the golf ball if the golf ball moves; and
  driving to a location that is a minimum specified distance from a new location of the golf ball.

18. The method of claim 17 wherein the golf ball mode first comprises the step of:
  providing the autonomous vehicle with a plurality of no-drive zones, the autonomous vehicle stopping as one of the plurality of no-drive zones is approached to prevent the autonomous vehicle from entering the one of the plurality of no-drive zones.

19. The method of claim 17 wherein the ride mode further comprises the steps of:
  detecting the golfer on board the autonomous vehicle; and
  driving the golfer to a specified location.

20. The method of claim 17 wherein the follow golfer mode further comprises the steps of:
  activating the camera on the autonomous vehicle;
  detecting the golfer;
  following the golfer; and
  maintaining a minimum distance between the golfer and the autonomous vehicle, the autonomous vehicle remaining stationary if a distance between the golfer and the autonomous vehicle is at or less than the minimum distance, the autonomous vehicle traveling towards the golfer if the distance is greater than the minimum distance.

* * * * *